United States Patent [19]

Martin

[11] Patent Number: 4,466,775
[45] Date of Patent: Aug. 21, 1984

[54] HELICOPTER ROTORS

[75] Inventor: Alfred C. Martin, Shepton Mallet, England

[73] Assignee: Westland plc, Yeovil, England

[21] Appl. No.: 440,285

[22] Filed: Nov. 9, 1982

[30] Foreign Application Priority Data

Nov. 19, 1981 [GB] United Kingdom ............... 8134956

[51] Int. Cl.³ .......................................... B64C 11/28
[52] U.S. Cl. .................................. 416/143; 416/158
[58] Field of Search ...................... 416/142, 143, 158

[56] References Cited

U.S. PATENT DOCUMENTS

| 3,343,610 | 9/1967 | Vacca et al. | 416/142 |
| 3,369,610 | 2/1968 | Dancik | 416/143 |
| 3,749,515 | 7/1973 | Covington et al. | 416/143 |
| 3,750,982 | 8/1973 | Gear | 416/142 X |

FOREIGN PATENT DOCUMENTS

| 57053 | 8/1982 | European Pat. Off. | 416/142 |
| 1333853 | 10/1973 | United Kingdom | 416/143 |

Primary Examiner—Everette A. Powell, Jr.
Attorney, Agent, or Firm—Larson and Taylor

[57] ABSTRACT

A helicopter rotor having a rotor hub and a plurality of rotor blades includes for each blade a blade fold mechanism comprising a reversible rotary power source and a rack and pinion mechanism adapted to operate one or more lock pins and to fold the blades between an operational spread position and a folded position. Two embodiments of the invention are described and illustrated.

19 Claims, 9 Drawing Figures

HELICOPTER ROTORS

This invention relates to helicopter rotors and particularly to such rotors incorporating a powered blade folding mechanism adapted to move a rotor blade between a spread position for normal operation and a folded position for storage.

It is often desirable to fold the rotor blades of a helicopter in order to reduce the required handling and stowage area, especially when operating such helicopters from confined spaces.

Existing operational powered fold mechanisms are generally complex and bulky devices requiring a high level of servicing and maintenance activity, and causing high aerodynamic drag loads during flight of the helicopter. One such device disclosed in USA-A-No. 3097701 is hydraulically operated and utilises complex gear sectors for folding and a separate hydraulic system for extraction and re-insertion of blade locking pins. Another type of blade fold mechanism disclosed in UK-A-No. 1036028 uses a rotary power source in combination with a complicated series of links and levers, most of which are located externally of the blade and hub and are therefore vulnerable to damage and corrosion as well as being aerodynamically unsound. UK-A-No. 1375658 discloses, in one embodiment, a helicopter rotor having a blade fold mechanism powered by a reversible rotary power source and including a complex system of camming slots, camming surfaces and cam followers adapted to move a single radially extending lock pin and to retain the lock pin in the withdrawn position during folding of the rotor blade.

Accordingly, this invention provides a helicopter rotor having a rotor hub for rotation about an axis, a plurality of rotor blades each pivotally connected to the hub for movement between an operational spread position and a folded position, lock means for locking said blade in the spread position and a reversible rotary power source, characterised in that the rotor includes a rack and pinion mechanism driven by the power source and adapted to release the lock means prior to moving the blade to its folded position and to re-engage the lock means when the blade is moved to its spread position.

The lock means may comprise at least one lock pin slidably mounted for lateral engagement in an apertured jaw portion in the rotor hub and a mating apertured insert formed on a blade attachment cuff. Conveniently, the or each lock pin is located parallel to the rack.

In one embodiment, the lock means may comprise two vertically spaced-apart lock pins fixedly attached to an outer end of the rack.

The pinion meshed with the rack may be rotationally fixed to a rotatable shaft on the rotor hub, the shaft having a further pinion meshed with a toothed segment gear rotationally fixed to a rotatable housing of the rotary power source.

Retention means adapted to retain the or each lock pin in its released position may comprise a spring-loaded latch pivotally attached to the rotor hub and having an outwardly extending arm for engagement by a stop means on the rack when the lock pins are released, and an inwardly extending arm for engagement by a surface of the insert entering the jaw portion as the blade moves towards its spread position, thereby pivoting the latch so that the outwardly extending arm disengages from the stop means.

In another embodiment, a single lock pin may be formed integrally at one end of the rack and the pinion meshed with the rack may be rotationally fixed to a rotatable housing generally centrally of the rotary power source.

Stop means may be provided to prevent rotational movement of the pinion when the lock pin is released and may comprise an abutment surface formed on the periphery of the pinion and adapted to contact an external surface of the rack when the lock pin is released.

Retention means may be provided to retain the lock pin in its released position while the blade is folded. The retention means may include an elongated ring located around the periphery of the rack in a cavity in the arm end having an internal diameter greater than an external diameter of the rack to permit reciprocal radial movement of the ring, spring means adapted to bias the ring radially outwardly to a position in which an edge of the ring prevents rotation of the pinion tending to move the rack when the blade is in the folded position and a protrusion on the blade cuff adapted to move the ring against the spring bias as the blade is moved towards its spread position.

The rotary power source may comprise an electrically powered actuator and a speed reducing gearbox and may be located concentrically of the pivot axis which may be offset from a blade centreline extended through the axis of rotation of the rotor hub.

The invention will now be described by way of example only and with reference to the accompanying drawings in which.

Figure 1:
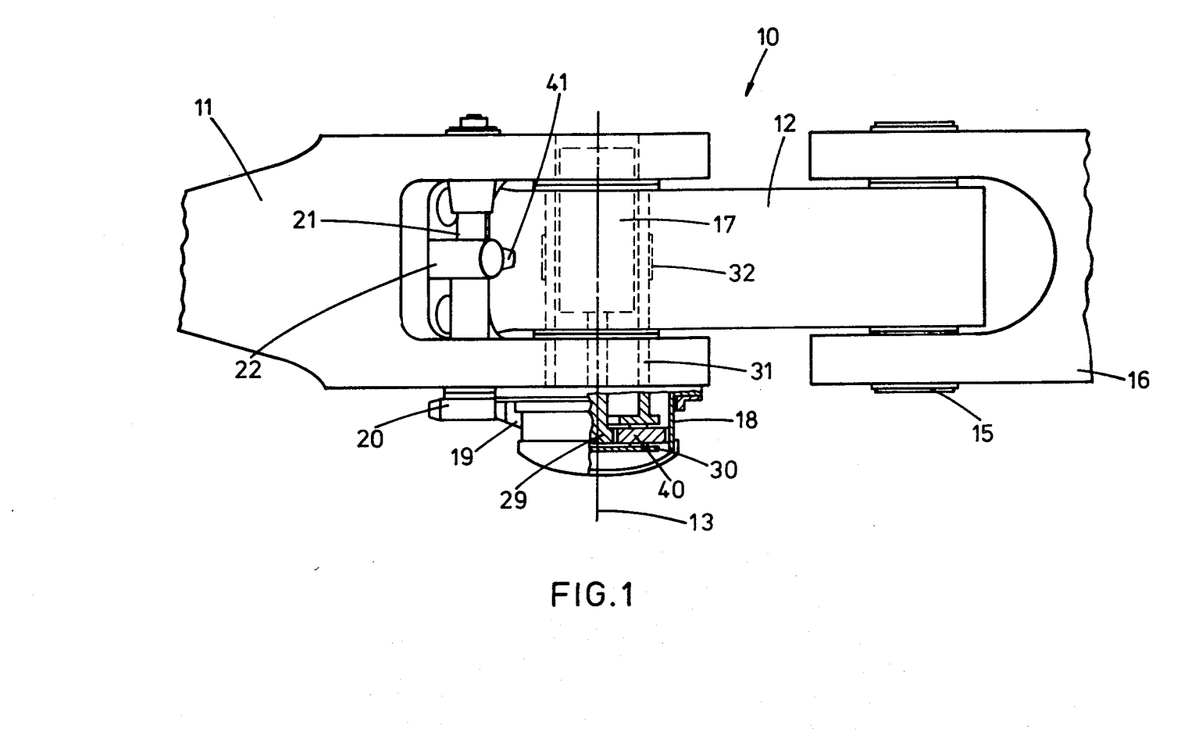
FIG. 1 is a fragmentary part-sectioned side elevation of a helicopter rotor constructed in accordance with one embodiment of the invention, showing a rotor blade in its spread operational position.
Figure 2:
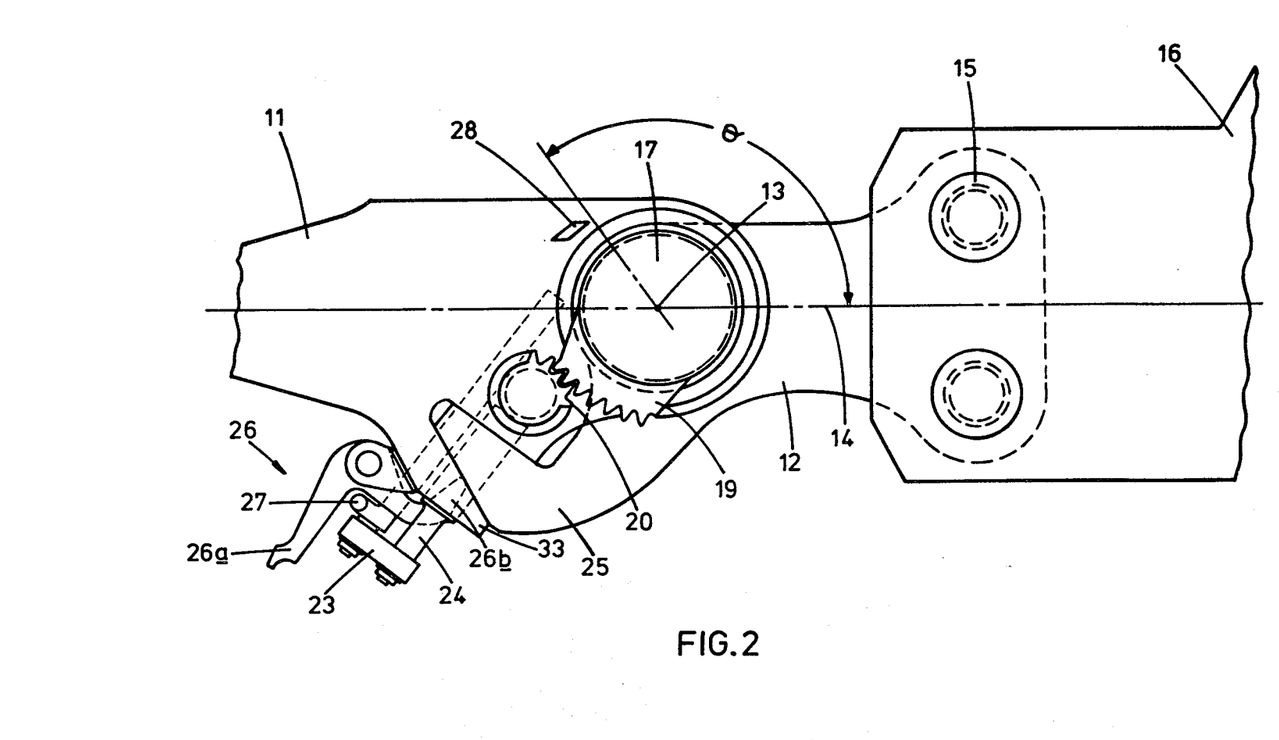
FIG. 2 is an underside plan view of the rotor of FIG. 1.
Figure 3:
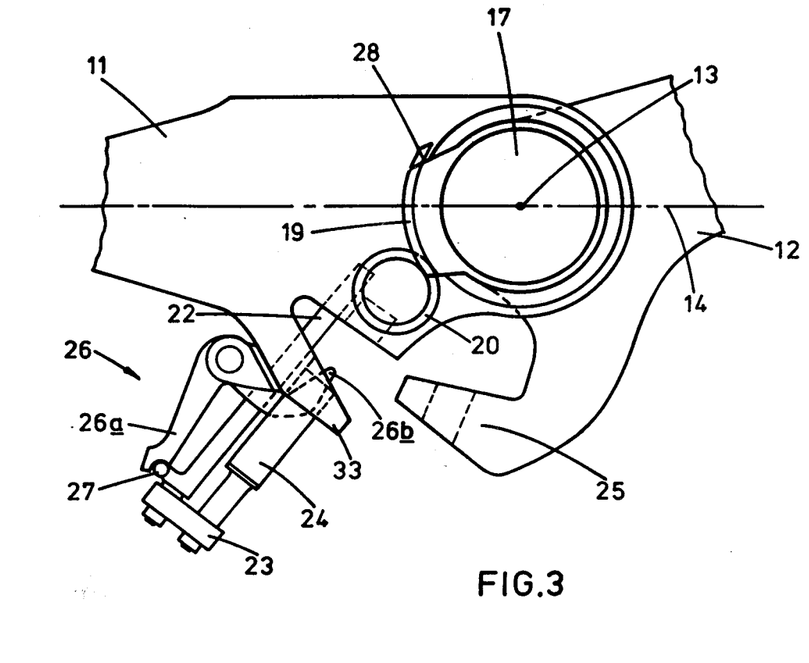
FIG. 3 is a view similar to FIG. 2 and showing the rotor blade in a partially folded position.

Referring now to FIGS. 1, 2, and 3, a helicopter rotor includes a blade fold mechanism generally indicated at 10 and located at the outer end of a forked blade support 11 extended radially from a rotor hub (not shown).

A rotor blade attachment cuff 12 is pivotally connected to arm 11 about a generally vertical axis 13 located on a longitudinal centreline 14. The cuff 12 includes two bolted attachments 15 for connection to a rotor blade 16.

Located concentrically of axis 13 and through apertures in the arm 11 and the cuff 12 is an electrically powered actuator 17 and an epicyclic speed reducing gearbox 18. The gearbox 18 includes sun gear 29 and planet carrier 30 which is rotationally fixed to the cuff 12 by a shaft 31 and splines 32.

The casing of gearbox 18 carries a toothed segment gear 19 meshed with a pinion 20 rotationally fixed at one end of a shaft 21 rotatably supported by the arm 11. A further pinion 41 (FIG. 1) is located on the shaft 21 centrally of the forked end of arm 11, and meshes with a toothed rack 22 slidably mounted in the arm 11. Stop means in the form of a raised abutment 28 is located on the surface of the arm 11 for a purpose hereinafter described.

An outer end of rack 22 is fixedly attached through a bolted plate 23 to each of two vertically spaced-apart lock pins 24 (one only being shown) which are located parallel to the rack 22 and slidably mounted in the arm 11 for selective engagement through apertured jaw positions 33 on the arm 11 and mating inserts 25 formed on an extension of the cuff 12.

As illustrated in FIG. 2, retention means comprising a latch mechanism generally indicated at 26 is pivotally mounted on the arm 11. The mechanism 26 has a first arm 26a extending outwardly generally parallel to the rack 22 and terminating in a shaped outer end adapted for a purpose to be hereinafter described. A second arm 26b extends generally inwardly for contact with an outer surface of one of the inserts 25, and spring means (not shown) is adapted to force the arm 26b into contact with the inserts 25. A stop surface 27 carried by the rack 22 is adapted for operative engagement with the arm 26a of mechanism 26 during certain phases of operation.

FIGS. 4 to 9 inclusive illustrate a further embodiment of the invention in which like reference numerals have been used to indicate similar parts.

In this embodiment the blade support 11 is pivotally attached to a forked blade attachment cuff about a generally vertical axis 13 which is offset from the longitudinal axis 14, the blade cuff 12 including two bolted attachments 15 for a rotor blade 16.

The blade cuff 12 includes a single central apertured locking insert 25 for engagement in an apertured jaw portion 33 on the arm 11, locking being accomplished by a lock pin 24 formed integrally at one end of a rack 22 slidably mounted in an aperture in arm 11 for reciprocal sliding movement in a direction generally perpendicular to axis 14.

Figure 4:
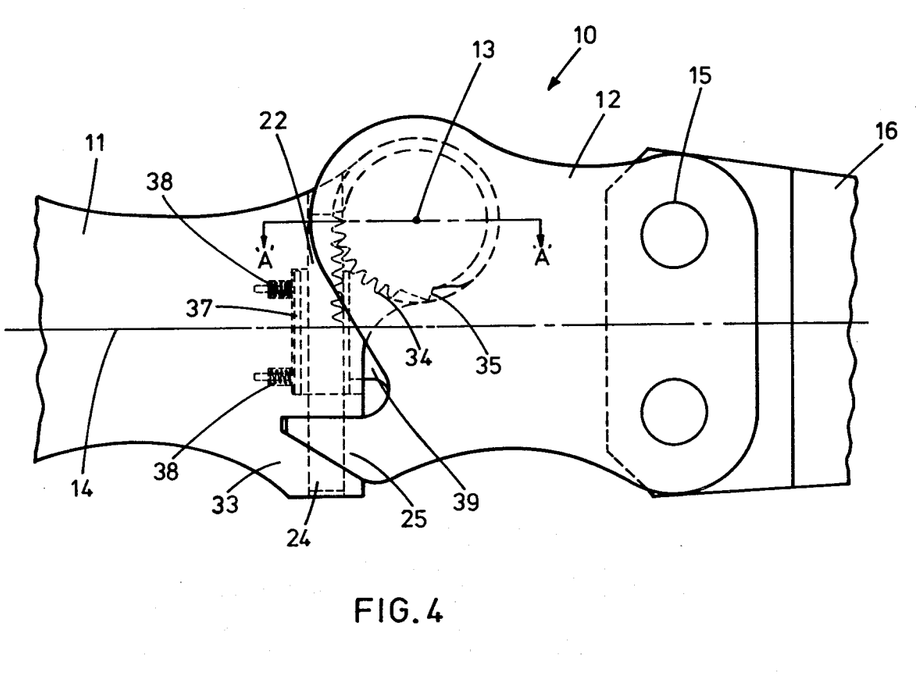
FIG. 4 is a fragmentary plan view of a helicopter rotor constructed in accordance with a further embodiment of the invention showing a rotor blade in its operational spread position.
Figure 5:
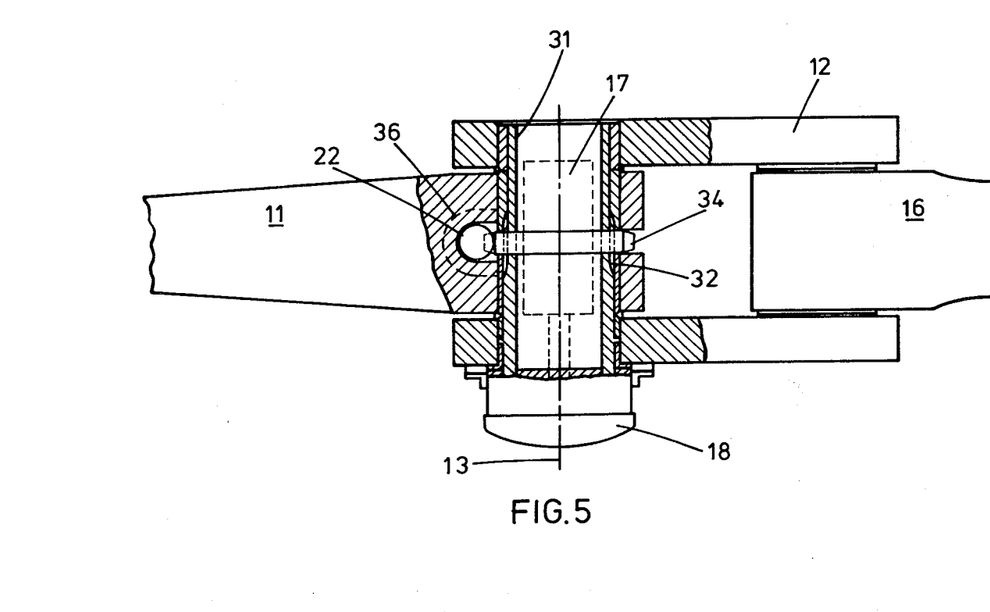
FIG. 5 is a fragmentary side elevation of the rotor of FIG. 4 partially sectioned along lines A—A of FIG. 4.

As shown in FIGS. 4 and 5, the toothed end of rack 22 remote from the lock pin end is meshed with a central pinion 34 supported on the splines 32 of shaft 31. The installation of the motor 17 and gearbox 18 is similar to that previously described with reference to the embodiment of FIGS. 1 to 3 except that the casing of gearbox 18 is rotationally fixed to the surface of blade cuff 12.

Stop means in the form of an abutment surface 35 is formed on the periphery of the pinion 34.

An open-ended cavity 36 is formed in the arm 11 and houses retention means in the form of an elongated ring 37 (FIGS. 8 and 9) located around the periphery of the rack 22. The ring 37 has an internal diameter greater than an external diameter of the rack 22 to permit reciprocal radial movement of the ring 37 and is biassed radially outwardly by two laterally spaced-apart springs 38.

A protrusion 39 formed integral with the cuff 12 is adapted to contact the external peripheral surface of the ring 37 during certain phases of operation.

In operation of the embodiment of the blade fold mechanism 10 illustrated in FIGS. 1 to 3, an initial energisation of the actuator 17 rotates sun gear 29. Since the lock pins 24, located through the apertured inserts 25, prevent corresponding rotation of the planet carrier 30 and shaft 31 the rotation of the sun gear 29 results in rotation of the casing of gearbox 18 carrying the toothed segment 19, which rotation is transmitted through the lower pinion 20, the shaft 21 and the central pinion (not shown) to drive the rack 22 outwardly from the arm 11. This movement of the rack 22 is transmitted through the plate 23 to withdraw the lock pins 24 from the jaws 25 and continues until the surface of segment 19 contacts the abutment 28.

Following withdrawal of the lock pins 24, and with the gear segment 19 abutting the stop 28, further rotation of the actuator 17 rotates the planet carrier 30 and this rotation is transmitted by the shaft 31 and splines 32 to rotate the cuff 12 and, therefore, the attached blade 16, about the axis 13 and through the desired fold angle $\theta$. It will be noted that the fold angle will vary depending on which of a set of blades is being folded.

Initial movement of the blade cuff 12 withdraws the inserts 25 from engagement in the portions 33 of the arm 11 and this permits counterclockwise pivotal movement of the mechanism 26 under the influence of the spring (not shown). This spring force serves to engage the shaped outer end of arm 26a with the top surface 27, which has been moved outwardly with the rack 22 to retain the lock pins 24 in the released position as illustrated in FIG. 3.

In spreading the blade 16, the engaged arm 26a and stop 27 prevents movement of the rack, and therefore of the lock pins 24, until the inserts 25 are moved back into engagement in the jaw portions 33 in arm 11, thereby contacting arm 26b to pivot arm 26a out of engagement with the stop surface 27. Further energisation of the actuator 17 causes rotation of the casing that is effective to drive the rack 22 back into the position illustrated in FIG. 2, thereby re-inserting the lock pins 24 to secure the blade 16 in the spread position.

Coming now to the operation of the embodiment of FIGS. 4 to 9 it will be remembered that the casing of gearbox 18 is rotationally fixed so that initial energisation of the actuator is transmitted through the epicyclic gearing to rotate the shaft 31 (FIG. 5) clockwise as viewed in FIG. 4. This rotation is transmitted through the splines 32 to pinion gear 34 to move the rack 22 inwardly from the position illustrated in FIG. 4 to that of FIG. 6 in which the integral lock pin 24 is withdrawn from its locking engagement through the mating apertures in jaw portion 33 and insert 25.

Figure 6:
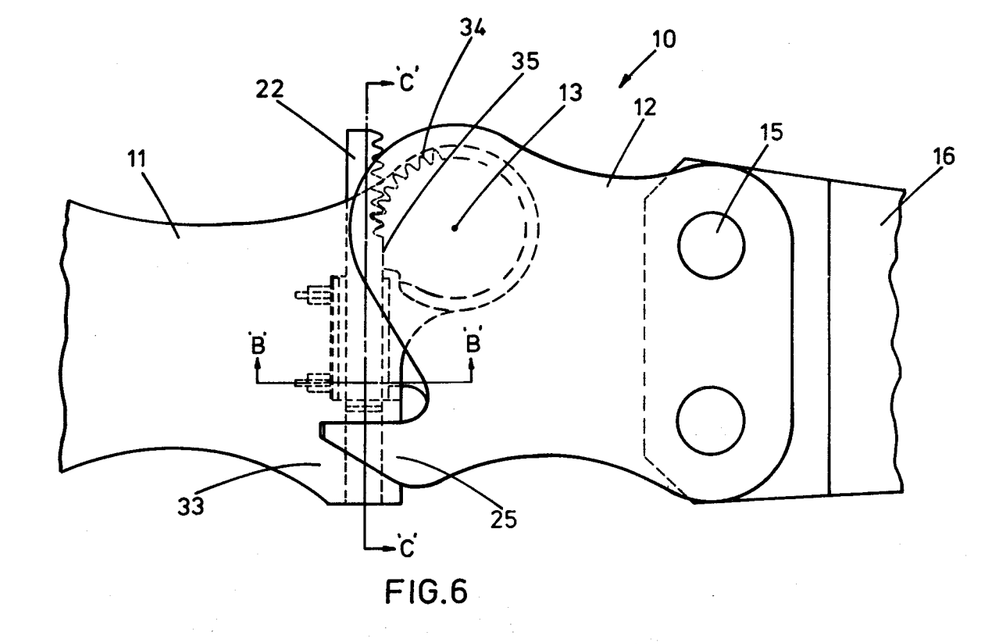
FIG. 6 is a view similar to FIG. 4 and illustrating a first phase of a blade folding sequence.

As shown in FIG. 6, once the lock pin is withdrawn, the abutment surface 35 on pinion 34 is moved into contact with the external surface of the rack 22 to prevent further counterclockwise rotation of the pinion 34.

Figure 7:
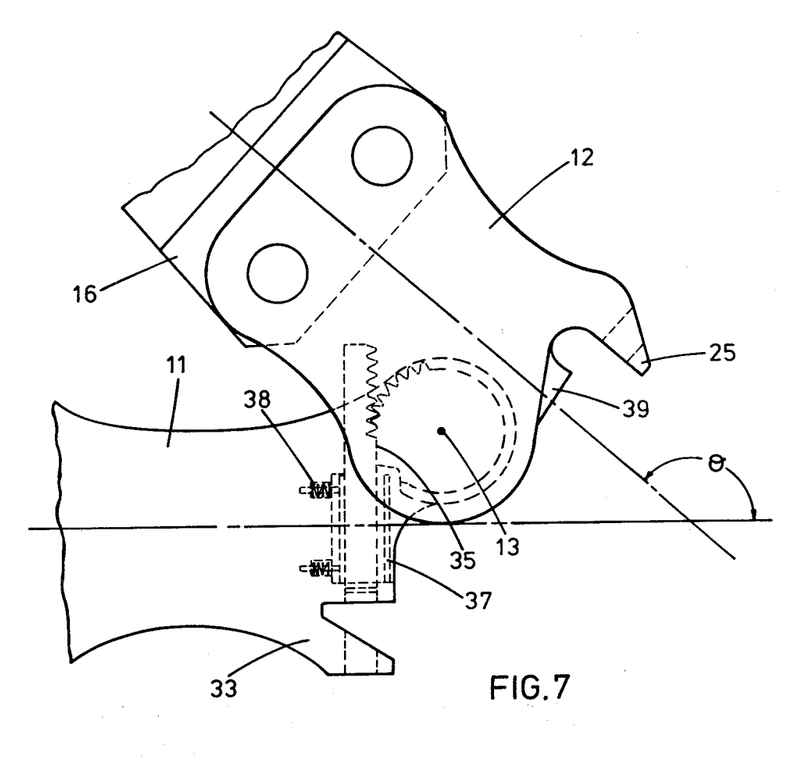
FIG. 7 is a view similar to FIG. 4 and illustrating the blade in its folded position.
Figure 8:
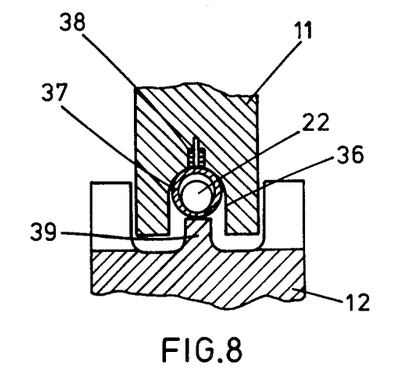
FIG. 8 is a fragmentary sectioned view taken along lines B—B of FIG. 6.
Figure 9:
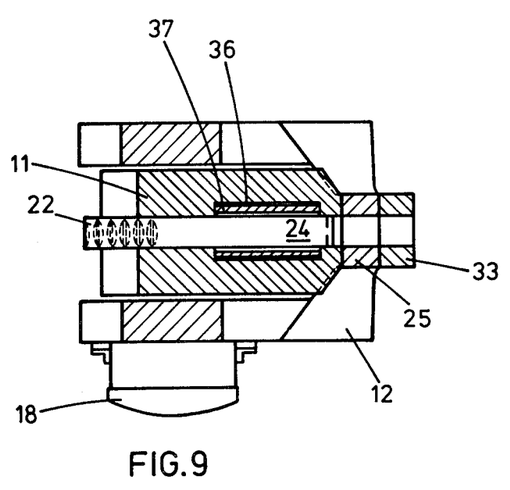
FIG. 9 is a fragmentary sectioned view taken along lines C—C of FIG. 6.

Once the lock pin 24 has been withdrawn (FIG. 6), further rotation of the actuator 17 is re-acted due to the contact between the abutment surface 35 and the surface of the rack 22, causing the drive to be transmitted through the casing of the gearbox 18 to rotate the blade cuff 12 and therefore the attached blade 16 about the axis 13 and through the pre-set fold angle $\theta$ (FIG. 7).

When the blade cuff 12 moves away from the position of FIG. 6, the protrusion 39 is moved out of contact with the ring 37 which moves outwardly under the influence of the springs 38 until the internal surface of the ring 37 contacts the surface of he rack 22 as shown in FIG. 7.

To move the blade 16 back to the spread position, the actuator 17 is energised to rotate in the opposite direction. The tendency for the pinion 34 to rotate counterclockwise is prevented by surface 35 coming into contact with the edge of ring 37 thereby resulting in movement of the blade 16 towards the fully spread position of FIG. 6. As the insert 25 enters the jaw portion 33 the protrusion 39 contacts the external surface of the ring 37 which is thereby moved inwardly to release the pinion 34 so that, when the insert 25 is fully home, the pinion 34 is rotated counterclockwise to drive the rack 22 serving to re-insert the lock pin 24 into engagement in the mated inserted 25 and jaw portion 33.

Thus, the various embodiments of the present invention provide a helicopter rotor incorporating a blade fold mechanism 10 which provides for the extraction of one or more lock pins, blade folding and spreading and re-insertion of the lock pin(s) from a single power source. The operating mechanism is arranged so that full power is available for operation of the lock pin(s) 24 during that part of the operational cycle when the folding function of the mechanism is operationally dead.

The powered blade fold mechanism of the invention are compact and aerodynamically clean thereby reducing weight and drag. In this respect, the embodiment of FIGS. 4 to 9 inclusive in which the fold hinge and actuator axis is offset from the longitudinal axis 14 and in which the single lock pin 24 is withdrawn inwardly is particularly attractive.

Whilst two embodiments of the invention have been described and illustrated, it will be understood that many modifications can be made without departing from the scope of the invention as defined in the appended claims. For instance, other suitable types of speed reducing gearbox such as harmonic drive or differential gear system could be used. The fold hinge axis 13 could be spaced-apart from the axis of the actuator 17, which may further reduce the required space envelope by reducing the height of the actuator/gearbox assembly. The location of the pivot axis 13 can be varied in the respective embodiments i.e. the embodiment of FIGS. 1 to 3 can be modified to locate the axis 13 offset from the longitudinal axis 14 and the embodiment of FIGS. 4 to 9 can be modified to locate the pivot axis 13 coincident with the longitudinal axis 14.

What is claimed is:

1. A helicopter rotor having:
a rotor hub for rotation about an axis;
a plurality of rotor blades, each blade pivotally connected to said hub so as to permit movement of said blade between an operational spread position and a folded position;
lock means for locking each said blade in said spread position;
a reversible rotary power means for moving each said blade between said spread position and said folded position; and
a rack and pinion mechanism that includes a rack and a pinion, one of which is driven by said power means and the other of which is operationally connected to said lock means such that said power means operates said rack and pinion mechanism for releasing said lock means prior to said power means moving said blade to said folded position thereof, and for re-engaging said lock means when said blade has been moved to said spread position by said power means.

2. A rotor as claimed in claim 1, wherein the lock means comprise at least one lock pin slidably mounted for lateral engagement in an apertured jaw portion on the rotor hub and a mating apertured insert formed on a blade attachment cuff.

3. A rotor as claimed in claim 2, wherein the or each lock pin is located parallel to the rack.

4. A rotor as claimed in claim 3 and including two vertically spaced-apart lock pins fixedly attached to an outer end of the rack.

5. A rotor as claimed in claim 4, wherein the pinion meshed with the rack is rotationally fixed to a rotatable shaft on the rotor hub, the shaft having a further pinion meshed with a toothed segment gear rotationally fixed to a rotatable housing of the rotary power source.

6. A rotor as claimed in claim 5 and including stop means to limit rotational movement of the rotatable housing.

7. A rotor as claimed in claim 3 and including retention means adapted to retain the or each lock pin in its released position.

8. A rotor as claimed in claim 7, wherein the retention means comprises a spring-loaded latch pivotally attached to the rotor hub and having an outwardly extending arm for engagement by a stop means on the rack when the lock pins are released and an inwardly extending arm for engagement by a surface of the insert entering the jaw portion as the blade moves towards its spread position thereby pivoting the latch so that the outwardly extending arm disengages from the stop means.

9. A rotor as claimed in claim 2, wherein the lock pin is formed integrally at one end of the rack.

10. A rotor as claimed in claim 9, wherein the pinion meshed with the rack is rotationally fixed to a rotatable housing centrally of the rotary power source.

11. A rotor as claimed in claim 10 and including stop means to prevent rotational movement of the pinion when the lock pin is released.

12. A rotor as claimed in claim 11, wherein the stop means comprise an abutment surface formed on the periphery of the pinion and adapted to contact an external surface of the rack when the lock pin is released.

13. A rotor as claimed in claim 12 and including retention means adapted to retain the lock pin in its released position when the blade is folded.

14. A rotor as claimed in claim 13 wherein the retention means includes an elongated ring located around the periphery of the rack in a cavity in the arm and having an internal diameter greater than an external diameter of the rack to permit reciprocal radial movement of the ring, spring means adapted to bias the ring radially outwardly to a position in which an edge of the ring prevents rotation of the pinion tending to move the rack when the blade is in the folded position, and a protrusion on the blade cuff adapted to move the ring against the spring bias as the blade is moved towards its spread position.

15. A rotor as claimed in claim 1, wherein the rotary power source includes an electrically powered actuator and a speed reducing gearbox.

16. A rotor as claimed in claim 1, wherein the rotary power source is located concentrically of the pivot axis.

17. A rotor as claimed in claim 1, wherein the pivot axis is offset from a blade centreline extended through the axis of rotation of the rotor hub.

18. A rotor as claimed in claim 1 wherein said power means is operationally connected to said pinion and said rack is operationally connected to said lock means.

19. A helicopter rotor including a rotor hub for rotation about an axis, a plurality of rotor blades each connected to the hub for movement about a generally vertical blade fold hinge between an operational spread position and a folded position, a reversible rotary power source adapted to drive a toothed gear about an axis parallel to the blade fold hinge, a toothed generally laterally extending rack meshed with said gear and at least one lock pin operatively associated with the rack and slidably mounted for lateral engagement in mating apertured portions attached to the rotor hub and rotor blade respectively, whereby energization of the power source operates the rack to release the lock means prior to moving the blade to its folded position and to re-engage the lock means when the blade is moved to its spread position.

* * * * *